United States Patent
Barzik et al.

(10) Patent No.: US 10,540,245 B2
(45) Date of Patent: Jan. 21, 2020

(54) ONE-STEP DISASTER RECOVERY CONFIGURATION ON SOFTWARE-DEFINED STORAGE SYSTEMS

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Eli Koren, Shoham (IL); Rivka M. Matosevich, Zichron-Ya'acov (IL); Alexander Snast, Rishon Le Zion (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 209 days.

(21) Appl. No.: 15/358,471

(22) Filed: Nov. 22, 2016

(65) Prior Publication Data
US 2018/0143888 A1 May 24, 2018

(51) Int. Cl.
G06F 11/00 (2006.01)
G06F 11/20 (2006.01)

(52) U.S. Cl.
CPC ...... G06F 11/2069 (2013.01); G06F 11/2082 (2013.01)

(58) Field of Classification Search
CPC .......................... G06F 11/2069; G06F 11/2082
See application file for complete search history.

(56) References Cited

U.S. PATENT DOCUMENTS

| | | | |
|---|---|---|---|
| 7,296,182 B2 | 11/2007 | Greenspan et al. | |
| 9,521,198 B1* | 12/2016 | Agarwala | G06F 12/0253 |
| 9,672,165 B1* | 6/2017 | Satish | G06F 13/10 |
| 9,678,680 B1* | 6/2017 | Natanzon | G06F 3/0619 |
| 9,830,234 B2* | 11/2017 | Earl | H04L 67/1097 |
| 9,836,367 B2* | 12/2017 | Ramani | G06F 11/2069 |
| 9,916,200 B2* | 3/2018 | Xu | G06F 11/1076 |
| 9,921,773 B2* | 3/2018 | Georgiev | G06F 3/0641 |
| 9,961,145 B1* | 5/2018 | Faibish | H04L 67/1097 |
| 9,965,203 B1* | 5/2018 | Agarwala | G06F 3/0619 |
| 10,191,916 B1* | 1/2019 | Faibish | H04L 67/1097 |
| 10,282,379 B2* | 5/2019 | Sareen | G06F 16/951 |
| 2011/0219263 A1 | 9/2011 | Goel | |
| 2012/0203742 A1 | 8/2012 | Goodman et al. | |

(Continued)

FOREIGN PATENT DOCUMENTS

CN 104125286 A 10/2014

OTHER PUBLICATIONS

Mark Peters, Monya Keane; "Key Reasons to Use Software-defined Storage—and How to Get Started"; IBM Whitepaper, IBM.com website; Feb. 2015.*

(Continued)

Primary Examiner — Joshua P Lottich
(74) Attorney, Agent, or Firm — Griffiths & Seaton PLLC

(57) ABSTRACT

Embodiments for disaster recovery (DR) configuration management in a Software-defined Storage (SDS) environment. An orchestration mechanism is used to automate a deployment and/or a configuring of two or more storage clusters for DR by arranging, in one step, a mirroring session between the two or more storage clusters in the SDS environment.

15 Claims, 8 Drawing Sheets

(56) References Cited

U.S. PATENT DOCUMENTS

| | | | |
|---|---|---|---|
| 2014/0115579 A1* | 4/2014 | Kong | G06F 3/0605 |
| | | | 718/1 |
| 2014/0181572 A1 | 6/2014 | Bradfield et al. | |
| 2015/0058487 A1* | 2/2015 | Karamanolis | G06F 12/0802 |
| | | | 709/226 |
| 2016/0239239 A1* | 8/2016 | Tin | G06F 3/0647 |
| 2016/0261727 A1* | 9/2016 | Yang | H04L 65/4069 |
| 2016/0328226 A1* | 11/2016 | Arya | G06F 8/63 |
| 2016/0357648 A1* | 12/2016 | Keremane | G06F 11/2069 |
| 2017/0060705 A1* | 3/2017 | Sridhara | G06F 11/1662 |
| 2017/0060710 A1* | 3/2017 | Ramani | G06F 11/2069 |
| 2017/0109184 A1* | 4/2017 | Ramani | G06F 9/45558 |
| 2017/0171310 A1* | 6/2017 | Gardner | H04L 67/1097 |
| 2018/0046545 A1* | 2/2018 | Xu | G06F 11/1076 |
| 2018/0048704 A1* | 2/2018 | Li | H04L 67/1042 |
| 2018/0150367 A1* | 5/2018 | Ramani | G06F 11/2069 |

OTHER PUBLICATIONS

Anonymous, "A method and system for Extracting Disaster Recovery Best Practices," An IP.com Prior Art Database Technical Disclosure, IP.com No. 000202333, Dec. 14, 2010 (5 pages).

Anonymous, "Building mutual volume mirror with storage virtualization engines between two sites," An IP.com Prior Art Database Technical Disclosure, IP.com No. 000227683, May 13, 2013 (6 pages).

Anonymous, "A Method and System for Achieving High Availability and Disaster Recovery within Stretched Hybrid Clouds," An IP.com Prior Art Database Technical Disclosure, IP.com No. 000239022, Oct. 1, 2014 (6 pages).

Regola et al., "Recommendations for Virtualization Technologies in High Performance Computing," 2010 (8 pages).

* cited by examiner

ONE-STEP DISASTER RECOVERY CONFIGURATION ON SOFTWARE-DEFINED STORAGE SYSTEMS

BACKGROUND OF THE INVENTION

Field of the Invention

The present invention relates in general to computing systems, and more particularly to, various embodiments for disaster recovery (DR) configuration management within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

The information age has enabled organizations to absorb, produce and analyze massive volumes of data. Nowadays, information in the form of digital data has become part of the core of many organizations' operations. Consequently, data is presently one of the most valuable assets of many organizations in a variety of fields, and in some cases is considered to be the key asset of the organization.

The survivability and recoverability of data systems following disaster situations has thus become a major concern of organizations around the world. It has become a necessity for organizations which are reliant upon the data stored in their data systems to ensure the survivability and the recoverability of the organization's data, in a way that the organization can quickly and efficiently recover from any event resulting in massive damage to the organization's data systems.

In order to mitigate massive data loss due to damage or other malfunction at a primary data storage server or system, it is common to backup the primary data storage server or system of an organization. For a backup system to successfully avoid the same data loss due to some event at the primary server, the backup system may be distributed and geographically removed from the primary server to ensure that any event which may damage the primary server is not likely to also affect the integrity of the backup system.

It has been suggested to transmit the data stored in the primary storage system to a secondary storage system, commonly referred to as a mirror server or system. The primary storage system and the mirror storage system may be located at different geographical locations (i.e. remote from one another), such that any event resulting in physical damage or operational failure of the primary storage system is not likely to damage or cause the operational failure of the backup/mirror storage system. This backup technique is commonly dubbed remote mirroring.

Since data storage/processing systems are dynamic, meaning that new data is regularly written to and read from these systems via write transactions and read transactions, backup or mirroring systems for these data storage and processing systems usually operate substantially in real-time. The use of substantially real-time data mirroring or backup systems is required to ensure that a most updated version as possible of the data stored in the primary server is backed up at the instant of a failure.

The present invention introduces novel techniques for deploying storage clusters and configuring mirror operations therebetween by way of various embodiments for disaster recovery (DR) configuration management in a Software-defined Storage (SDS) environment. In one embodiment, by way of example only, a method comprises using an orchestration mechanism to automate a configuring of two or more storage clusters for DR by arranging, in one step, a mirroring session between the two or more storage clusters in the SDS environment. This method can include using a deployment procedure to deploy a local and/or a remote storage cluster, configuring connectivity, and establishing a mirroring relationship therebetween, and other techniques as will be further described. Additionally, the mechanisms of the present invention may employ such functionality as optimizing remote mirroring connectivity and data transfer in the SDS environment by establishing each of a plurality of nodes in a local storage array and a remote storage array as a gateway node, as described in U.S. patent application Ser. No. 15/340,091.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
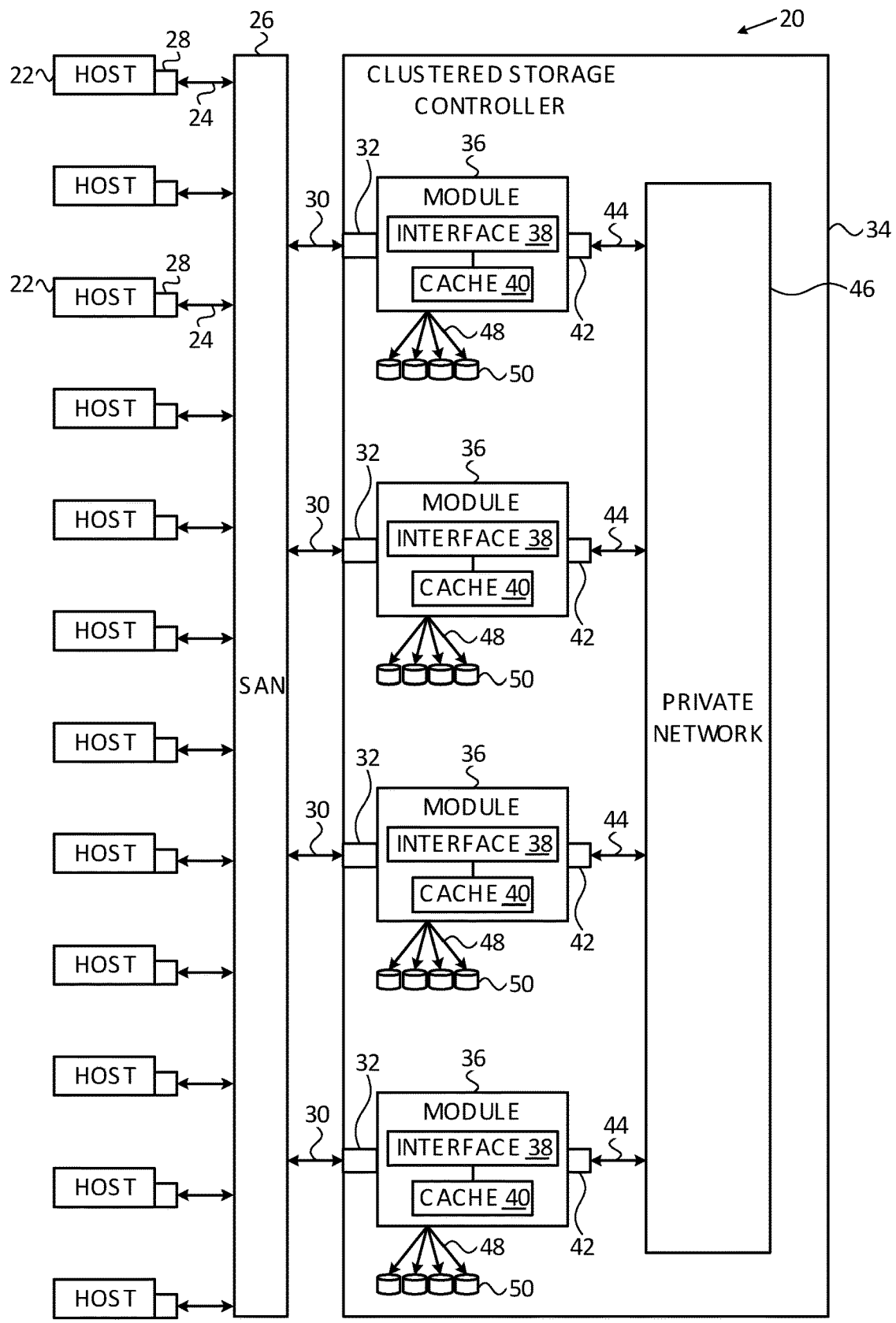
FIG. 1 illustrates a block diagram of a computer storage environment in which aspects of the present invention may be realized.

A distributed data storage system typically comprises cache memories that are coupled to a number of disks wherein the data is permanently stored. The disks may be in the same general location, or be in completely different locations. Similarly, the caches may be localized or distributed. The storage system is normally used by one or more hosts external to the system.

Using more than one cache and more than one disk leads to a number of very practical advantages, such as protection against complete system failure if one of the caches or one of the disks malfunctions. Redundancy may be incorporated into a multiple cache or multiple disk system, so that failure of a cache or a disk in the distributed storage system is not apparent to one of the external hosts, and has little effect on the functioning of the system.

While distribution of the storage elements has undoubted advantages, the fact of the distribution typically leads to increased overhead compared to a local system having a single cache and a single disk. Inter alia, the increased overhead is required to manage the increased number of system components, to equalize or attempt to equalize usage of the components, to maintain redundancy among the components, to operate a backup system in the case of a failure of one of the components, and to manage addition of components to, or removal of components from, the system. A reduction in the required overhead for a distributed storage system is desirable.

Software-defined Storage (SDS) is a computer data storage technology that separates storage hardware from the software that manages the storage infrastructure. By definition, SDS software is separate from the hardware it is managing.

Grid storage, as eluded to previously, is a computer data storage technology that stores data using multiple self-contained interconnected storage nodes (i.e., servers), so that any node can communicate with any other node without the data having to pass through a centralized node.

One advantage of grid storage systems is that its data distribution scheme offers a level of load balancing, fault-tolerance and redundancy across the system. It implies that if one storage node fails or if a pathway between two nodes is interrupted, the network can reroute data access via a different path or to a redundant node. In operation, SDS can implement a grid storage system to span data across multiple servers. That is, SDS storage systems are typically "scale out", or in other words comprise of a set of servers which make up a cluster which, when viewed externally, presents a single storage system.

In SDS, the backbone of the interconnect between the servers which makes up the system may be the data center networking. An SDS system may be made up of a number of servers working together as a cluster and connected by the interconnect. Each server in an SDS system may have certain software modules. In particular it may have an interface module which handles input/output (I/O) requests which are routed to the correct data module or node, according to the data distribution; a data module which is responsible for managing the data (i.e. store and retrieve the data and ensure consistency) where each data module "owns" part of the data managed by the storage system; and a gateway module or node which is responsible for sending data to a remote system when mirroring or migration techniques are employed.

At the same time, disaster recovery (DR) systems, as aforementioned, typically address a sudden catastrophic failure at a single point in time. To assist in recovery of data, a copy of data may be provided at a remote location. Such dual or shadow copies are typically made as the application system is writing new data to a primary storage device. Different copy technologies well known to those skilled in the art may be used for maintaining remote copies of data at a secondary site.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. The integrity of data updates is related to insuring that updates are done at the secondary volumes in the volume pair in the same order as they were done on the primary volume.

Many storage arrays support a solution for remote mirroring. The remote mirroring solutions often rely on Fibre or Internet Small Computer System Interface (iSCSI) connectivity between the local and remote arrays, over which the mirrored data is sent from the local array to the remote array. In some implementations, the local array appears like another host to the remote array and the data sent from the local array to the remote array appears as writes from a host.

Setting up these mirroring operations at a DR site is an important task in high-end storage. The common practice is to set up a local storage server, then set up a remote storage server on a remote site, and finally set up a mirroring session between the two systems. To deploy the storage servers and configure the mirroring session, the user must provide information on multiple user interfaces (UIs), including repetitions of parts of the same data (e.g., Internet Protocol (IP) addresses that are used to configure the remote and local site and then are used to configure the mirroring session as well). This task can become cumbersome and require an administrator to spend a prolonged period of time first deploying the storage servers and subsequently establishing the mirroring session between such while providing repetitious data.

Accordingly, to improve upon the art, the mechanisms of the present invention implement such functionality as using an orchestration mechanism to deploy both a local and a remote storage cluster and further configure and establish the mirroring session of the volumes on such and therebetween. Additional embodiments of existing storage clusters taking advantage of the orchestration mechanism are also provided. Further, as aforementioned, the mechanisms of the present invention may employ such functionality as optimizing remote mirroring connectivity and data transfer in the SDS environment by establishing each of a plurality of nodes in a local storage array and a remote storage array as a gateway node, as described in U.S. patent application Ser. No. 15/340,091.

It should be noted that the "orchestration mechanism" discussed herein may be implemented, for example, by computer code, a computer program, or specific hardware configured to perform the functionality of the present invention. To be clear, the orchestration mechanism, in one example, comprises a computer program running within the SDS environment and having a UI which, when executed, performs the functionality described herein.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50.

In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
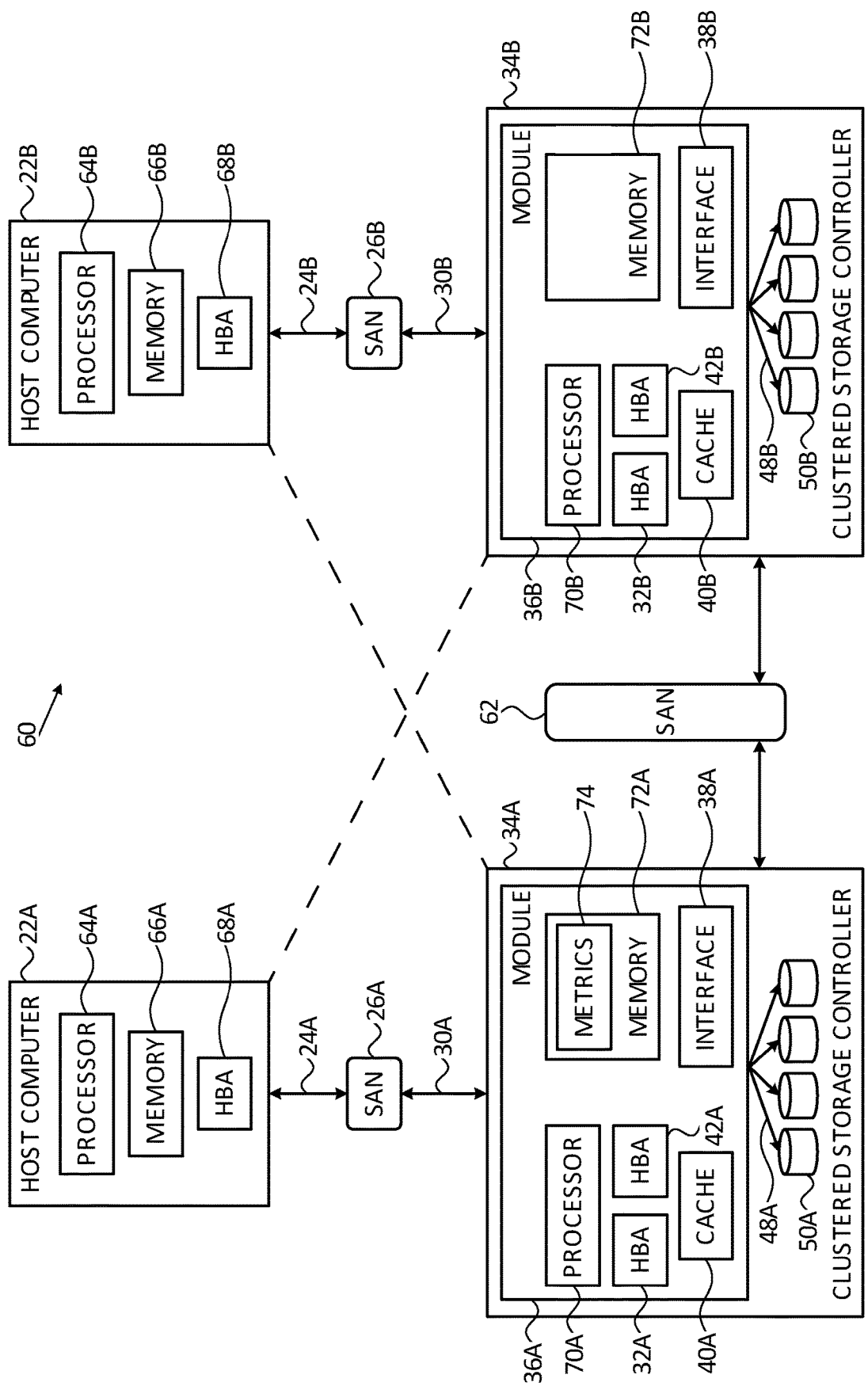
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2, storage controllers 34A and 34B are coupled via a facility SAN 62. In other embodiments, as will be described herein, the first host computer 22A may be directly connected to the clustered storage controller 34B, and the second host computer 22B may be directly connected to the clustered storage controller 34A via a SAN similar to SAN 62, a virtualized networking connection, or any other computer implemented medium. The coupling of the clustered storage controller 34A and clustered storage controller 34 B via SAN 62 enables the establishment of a variety of storage techniques including disaster recovery (DR) techniques. As will be further described herein, such coupling provides the back-end infrastructure needed for the establishment of data mirroring operations between the clustered storage controllers 34A/34B (and likewise between first host computer 22A and second host computer 22B interconnected between clustered storage controllers 34A/34B), or otherwise a host of related DR operations as commonly known in the art.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (i SC SI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 3:
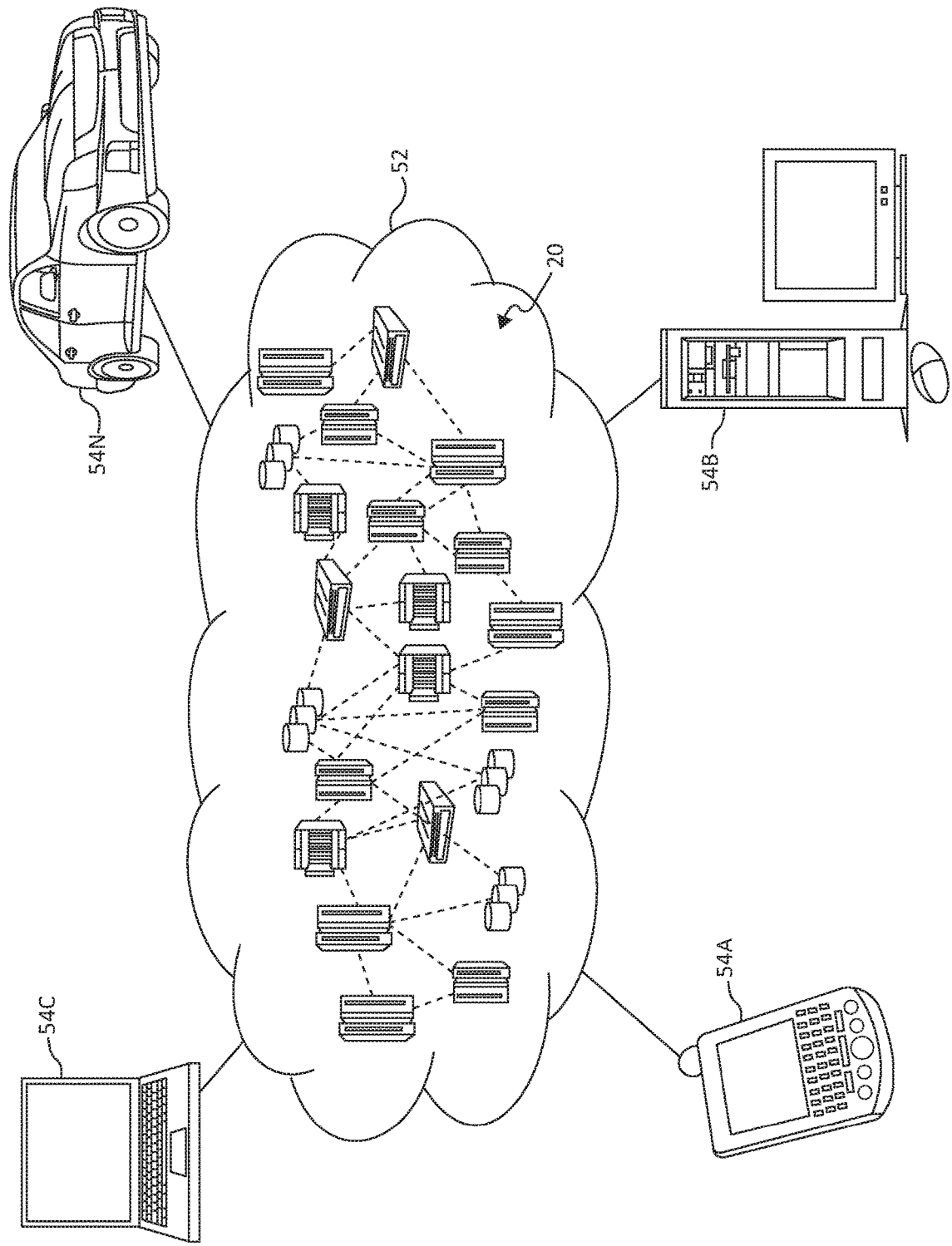
FIG. 3 illustrates a block diagram of an exemplary cloud computing environment according to embodiments of the present invention.

Referring now to FIG. 3, illustrative cloud computing environment 52 is depicted. As shown, cloud computing environment 52 comprises one or more storage subsystems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage subsystems 20, cloud computing nodes and cloud computing environment 52 can communicate with any type of computerized device over any type of network and/or network addressable connection (e.g., using a web browser).

Figure 4:
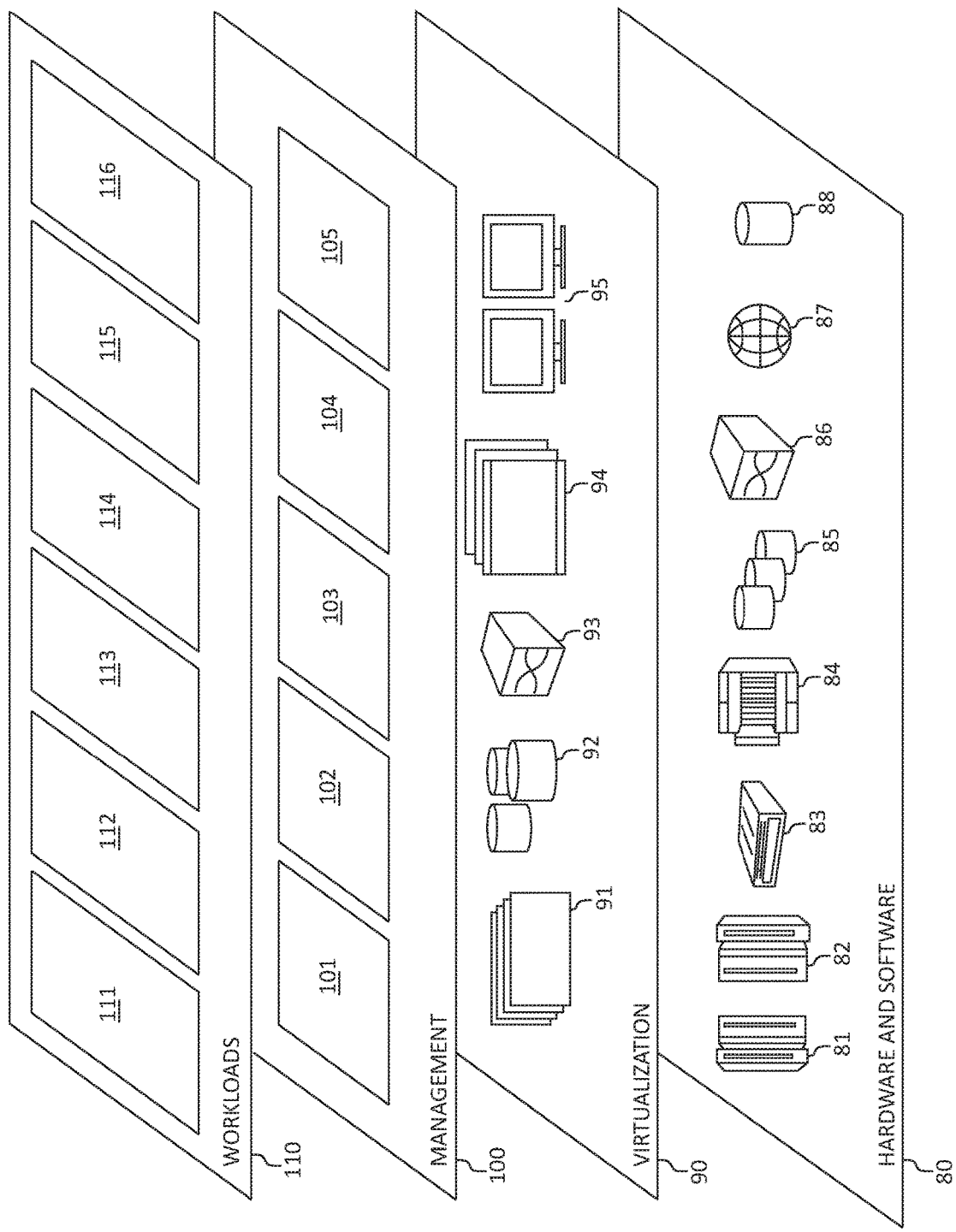
FIG. 4 illustrates a block diagram depicting abstraction model layers according to embodiments of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various data security workloads and functions 116, such as antivirus scanning workloads, or anti-malware scanning workloads. In addition, data security workloads and functions 116 may include such operations as data quarantining and/or data deleting functions. One of ordinary skill in the art will appreciate that the data security workloads and functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 5:
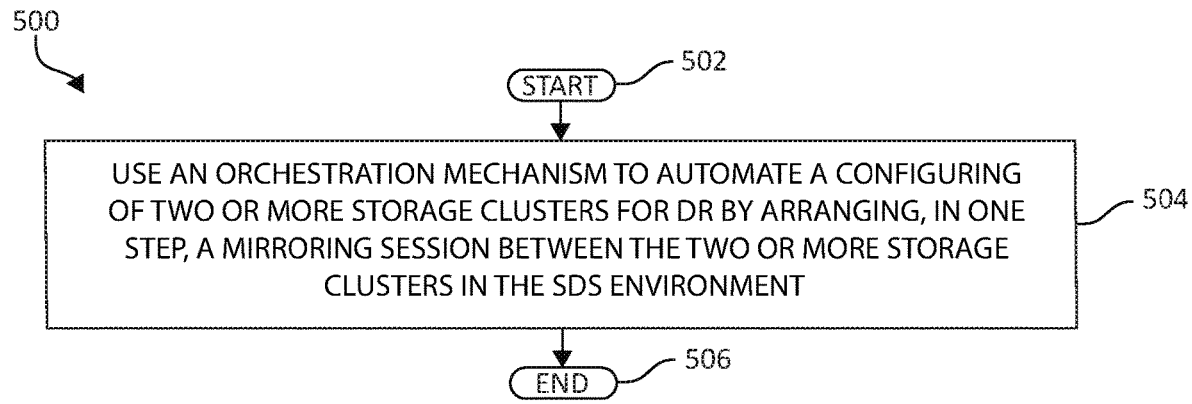
FIG. 5 illustrates a flowchart diagram illustrating an exemplary method for disaster recovery (DR) configuration management in a Software-defined Storage (SDS) environment by a processor, by which aspects of the present invention may be implemented.

Continuing, FIG. 5 illustrates a method 500 for DR configuration management in an SDS environment, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins (step 502) by using an orchestration mechanism to automate a configuring of two or more storage clusters for DR by arranging, in one step, a mirroring session between the two or more storage clusters in the SDS environment (step 504). This orchestration mechanism may or may not include deploying the actual storage clusters prior to configuring and establishing the mirroring session therebetween, as will be described. The method 500 ends (step 506).

As aforementioned, the present invention implements functionality as to use an orchestration mechanism (e.g. a computer program) to deploy both a local and a remote storage cluster (e.g. within storage subsystems 20) and further configure and establish the mirroring session of the volumes on such and therebetween. The present invention may include a number of embodiments, however for the sake of brevity, three advantageous embodiments will be focused upon:

In one embodiment, the orchestration mechanism deploys both local and remote storage clusters (on the local and the DR site), configures mirrored volumes and mirroring connectivity between the deployed local and remote storage clusters, and establishes a mirroring session therebetween.

In another embodiment, the orchestration mechanism instructs an existing local storage cluster to deploy a remote storage cluster and automatically set up and establish a mirroring session between the existing local storage cluster and the deployed remote storage cluster.

In a further embodiment, the orchestration mechanism instructs an existing local storage cluster to locate an existing remote cluster and set up and establish a mirroring session between the existing local storage cluster and the existing remote storage cluster.

In any of these embodiments, the local and remote machines may exchange information regarding their available IP connectivity and use the connectivity information to create a full mesh of connections between all available ports. These connections could then be used to optimize the data and any other type of traffic between the two systems.

Regardless of the embodiment used, information regarding the identities of the storage clusters and their IP connectivity is used for both setting up (deploying) the storage systems and additionally for configuring the mirroring session. The user is required to provide any piece of required information to the orchestration mechanism only once.

As aforementioned, deploying both the local and the remote (DR site) storage clusters is performed, for example, by using the orchestration mechanism. The orchestration mechanism receives information via a user UI (or alternatively, a Command Line Interface (CLI), etc.) about the servers on which to deploy the storage clusters either directly from the user or, alternatively, through an automated management system having knowledge of the storage system architecture. This information is used to set up and configure the two new systems (local and remote storage clusters), subsequently configure the volumes associated with the local and remote storage clusters, mirroring connectivity, and establish a mirroring session between the configured volumes of the local and remote storage clusters.

Setting up a second storage cluster (e.g. remote storage cluster) in addition to an existing, local storage cluster may be performed similarly, with the additional option of initiating the deployment procedure through the existing local storage cluster, which then serves as a deployment server. Once the second storage cluster (remote storage cluster) is set up, the same procedures as described above would continue in order to configure the volumes and/or mirroring relationship and thereby establish the mirroring session between the existing local storage cluster and the newly deployed storage cluster.

An existing storage cluster may also skip the deployment procedure described above and establish the DR infrastructure directly with a second exiting cluster. Each embodiment will be further described in the following Figures.

Figure 6:
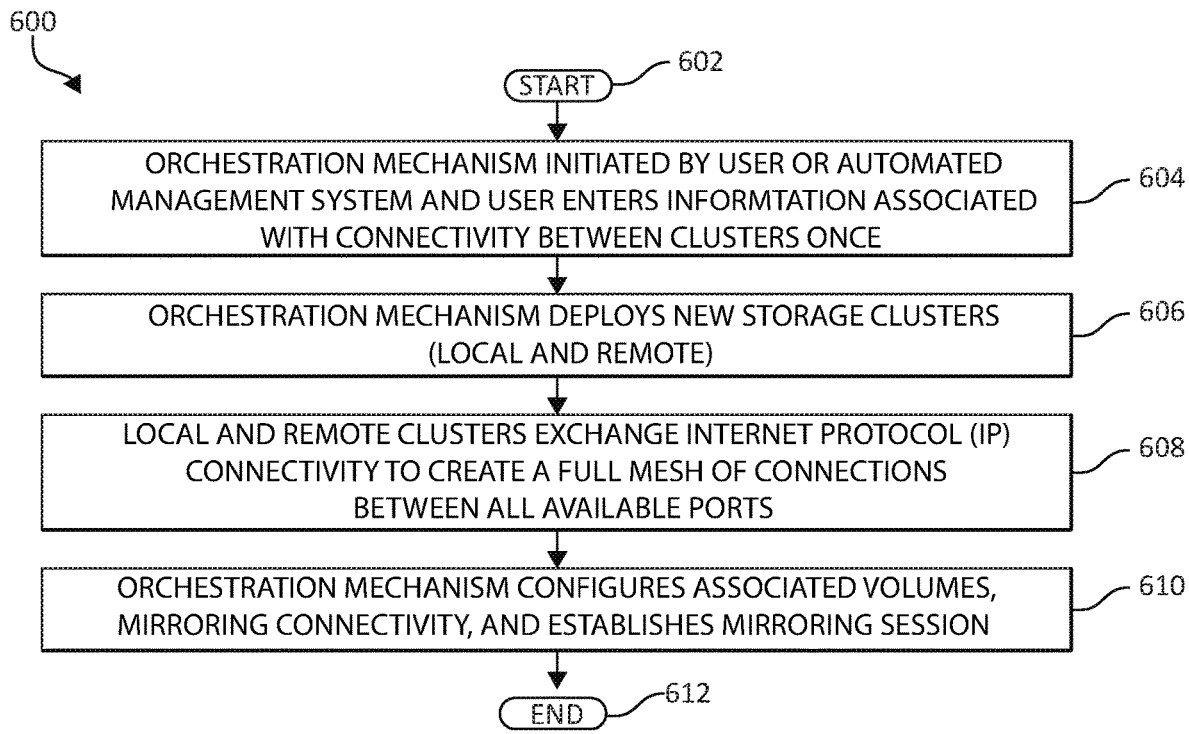
FIG. 6 illustrates an additional flowchart diagram illustrating an exemplary method for DR configuration management in an SDS environment by a processor, by which aspects of the present invention may be implemented.

FIG. 6 illustrates a method 600 for DR configuration management in an SDS environment, in accordance with one embodiment of the present invention. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Specifically, the method 600 illustrates the deployment of two new storage clusters (local and remote/DR site) by the orchestration mechanism as described herein. The method 600 begins (step 602) by initiating the orchestration mechanism either directly by a user, or alternatively, an automated management system. If the user is required to enter information regarding the deployment, configuration of volumes, and the establishment of the mirroring session between the local storage cluster and the remote storage cluster, the user only needs to provide this information one time (step 604).

The orchestration mechanism then deploys the new local storage cluster and the new remote/DR site storage cluster (step 606), and establishes connectivity. The connectivity is established by exchanging, by the local storage cluster and the remote storage cluster, IP connectivity or other information to create a full mesh between all available ports associated with the local and remote storage clusters (step 608). The orchestration mechanism automatically configures the volumes to be mirrored associated with the local and remote storage clusters, configures the mirroring connectivity as aforementioned, and establishes a mirroring session between the configured volumes of both the local and remote storage clusters (step 610). The method 600 ends (step 612).

Figure 7:
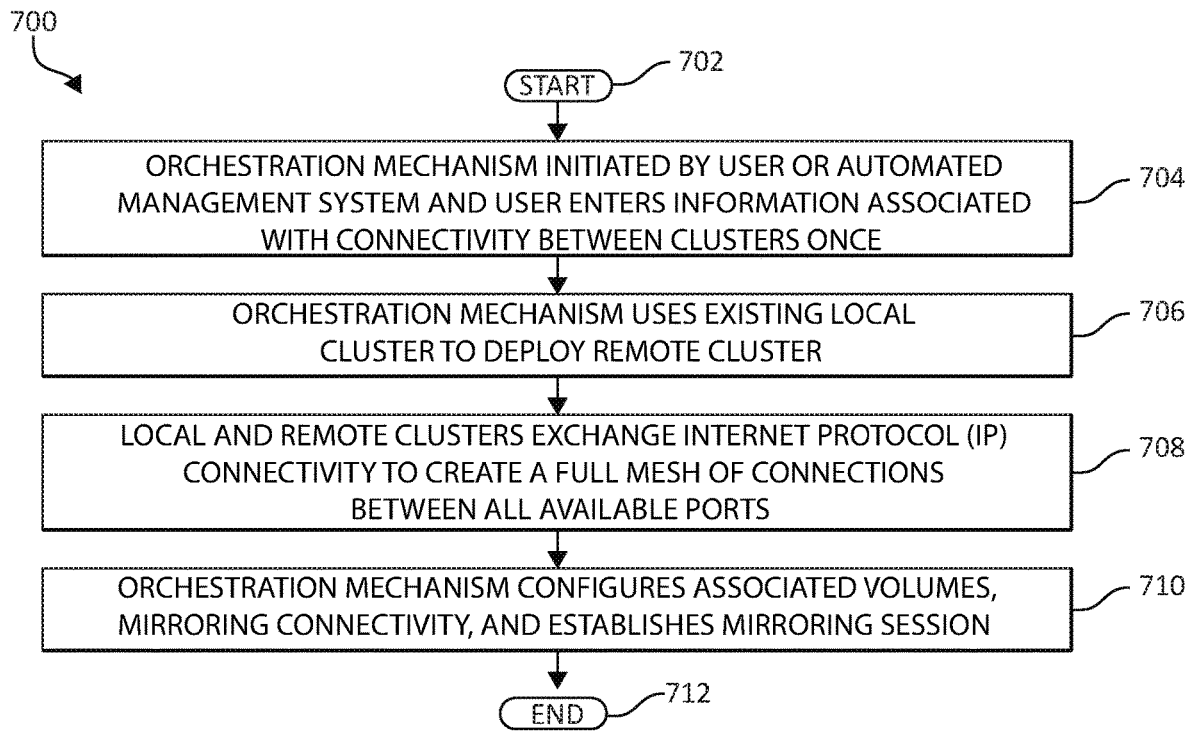
FIG. 7 illustrates an additional flowchart diagram illustrating an exemplary method for DR configuration management in an SDS environment by a processor, by which aspects of the present invention may be implemented.

Advancing, FIG. 7 illustrates a method 700 for DR configuration management in an SDS environment, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700.

Illustrative processors include, but are not limited to, a central processing unit (CPU), an application specific integrated circuit (ASIC), a field programmable gate array (FPGA), etc., combinations thereof, or any other suitable computing device known in the art.

Specifically, the method 700 illustrates the deployment of one new storage cluster (remote/DR site) using an existing storage cluster (local) by the orchestration mechanism as described herein. The method 700 begins (step 702) by initiating the orchestration mechanism either directly by a user, or alternatively, an automated management system. If the user is required to enter information regarding the deployment, configuration of volumes, and the establishment of the mirroring session between the local storage cluster and the remote storage cluster, the user only needs to provide this information one time (step 704).

The orchestration mechanism then uses the existing local storage cluster to deploy the new remote/DR site storage cluster (step 706), and establishes connectivity. The connectivity is established by exchanging, by the local storage cluster and the remote storage cluster, IP connectivity or other information to create a full mesh between all available ports associated with the local and remote storage clusters (step 708). The orchestration mechanism automatically configures the volumes to be mirrored associated with the local and remote storage clusters, configures the mirroring connectivity as aforementioned, and establishes a mirroring session between the configured volumes of both the local and remote storage clusters (step 710). The method 700 ends (step 712).

Figure 8:
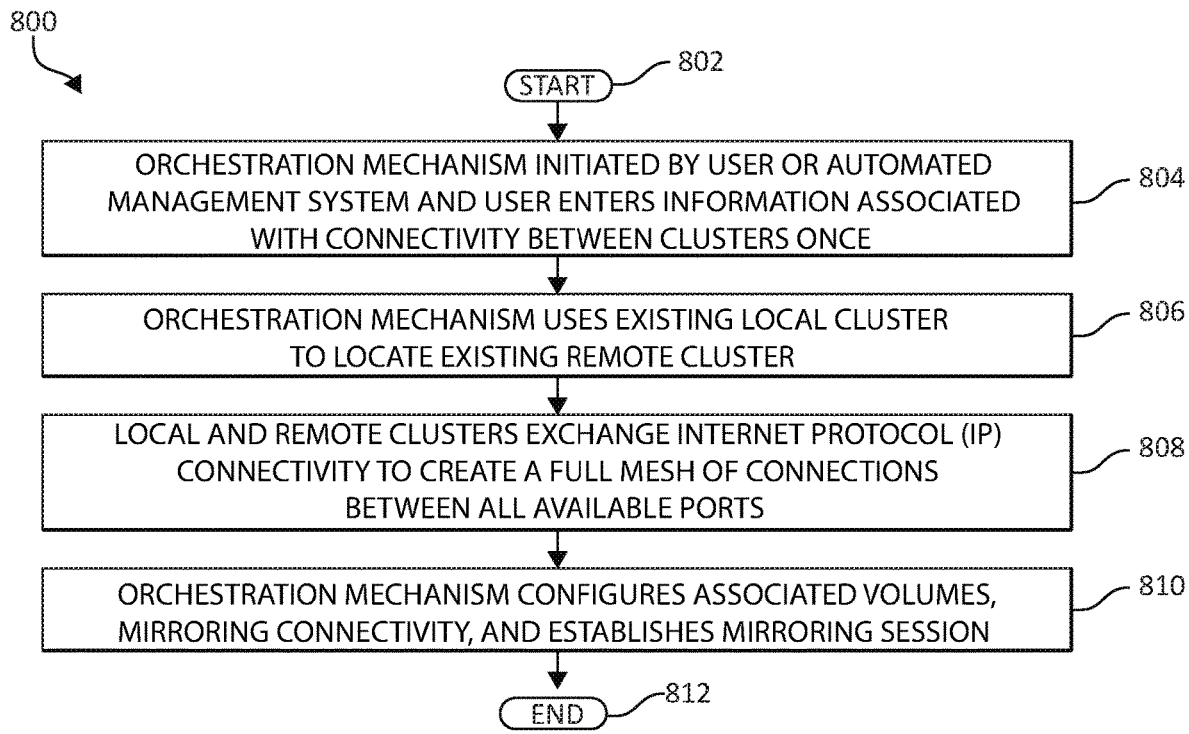
FIG. 8 illustrates still an additional flowchart diagram illustrating an exemplary method for DR configuration management in an SDS environment by a processor, by which aspects of the present invention may be implemented.

Concluding, FIG. 8 illustrates a method 800 for DR configuration management in an SDS environment, in accordance with one embodiment of the present invention. The method 800 may be performed in accordance with the present invention in any of the environments depicted in FIGS. 1-4, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

In this example, the method 800 illustrates the establishment of mirroring connectivity using an existing local storage cluster and an existing remote storage cluster by the orchestration mechanism as described herein. The method 800 begins (step 802) by initiating the orchestration mechanism either directly by a user, or alternatively, an automated management system. If the user is required to enter information regarding the configuration of volumes, and the establishment of the mirroring session between the local storage cluster and the remote storage cluster, the user only needs to provide this information one time (step 804).

The orchestration mechanism bypasses the deployment of any storage clusters by locating the existing local storage cluster and the existing remote/DR site storage cluster (step 806), and establishes connectivity. The connectivity is established by exchanging, by the local storage cluster and the remote storage cluster, IP connectivity or other information to create a full mesh between all available ports associated with the local and remote storage clusters (step 808). The orchestration mechanism automatically configures the volumes to be mirrored associated with the local and remote storage clusters, configures the mirroring connectivity as aforementioned, and establishes a mirroring session between the configured volumes of both the local and remote storage clusters (step 810). The method 800 ends (step 812).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for disaster recovery (DR) configuration management, by a processor, comprising:
    using an orchestration mechanism to automate a configuring of two or more storage clusters for DR by arranging, in one step, a mirroring session between the two or more storage clusters;
    commensurate with arranging the mirroring session, exchanging by the two or more storage clusters, available internet protocol (IP) connectivity to create a full mesh of connections between all available ports of the two or more storage clusters; and
    using a deployment procedure, by the orchestration mechanism, to deploy the two or more storage clusters; wherein the two or more storage clusters are each new storage clusters.

2. The method of claim 1, wherein deploying the two or more storage clusters further includes configuring volumes associated with the two or more storage clusters, arranging mirroring connectivity between the configured volumes, and establishing the mirroring session between the configured volumes of the two or more storage clusters.

3. The method of claim 2, wherein one of the two or more storage clusters is an existing storage cluster and a second of the two or more storage clusters is a new storage cluster; and
    further including deploying, by the orchestration mechanism, the new storage cluster by the existing storage cluster and establishing the mirroring session between the existing and new storage clusters.

4. The method of claim 1, wherein each of the two or more storage clusters are existing storage clusters; and
    further including locating, by the orchestration mechanism, each of the existing storage clusters and establishing the mirroring session between the existing storage clusters.

5. The method of claim 1, wherein the orchestration mechanism is initiated through an automated management system or by a user; and
    the two or more storage clusters include local and remote storage clusters.

6. A system for disaster recovery (DR) configuration management, the system comprising:
    one or more computers, each of the one or more computers having a processor, wherein the processor:
    uses an orchestration mechanism to automate a configuring of two or more storage clusters for DR by arranging, in one step, a mirroring session between the two or more storage clusters;
    commensurate with arranging the mirroring session, exchanges by the two or more storage clusters, available internet protocol (IP) connectivity to create a full mesh of connections between all available ports of the two or more storage clusters; and
    uses a deployment procedure, by the orchestration mechanism, to deploy the two or more storage clusters; wherein the two or more storage clusters are each new storage clusters.

7. The system of claim 6, wherein deploying the two or more storage clusters further includes configuring volumes associated with the two or more storage clusters, arranging mirroring connectivity between the configured volumes, and establishing the mirroring session between the configured volumes of the two or more storage clusters.

8. The system of claim 7, wherein one of the two or more storage clusters is an existing storage cluster and a second of the two or more storage clusters is a new storage cluster; and
wherein the processor deploys, by the orchestration mechanism, the new storage cluster by the existing storage cluster and establishes the mirroring session between the existing and new storage clusters.

9. The system of claim 6, wherein each of the two or more storage clusters are existing storage clusters; and
wherein the processor locates, by the orchestration mechanism, each of the existing storage clusters and establishes the mirroring session between the existing storage clusters.

10. The system of claim 6, wherein the orchestration mechanism is initiated through an automated management system or by a user; and
the two or more storage clusters include local and remote storage clusters.

11. A computer program product for disaster recovery (DR) configuration management, by a processor, the computer program product embodied on a non-transitory computer-readable storage medium having computer-readable program code portions stored therein, the computer-readable program code portions comprising:
an executable portion that uses an orchestration mechanism to automate a configuring of two or more storage clusters for DR by arranging, in one step, a mirroring session between the two or more storage clusters;
an executable portion that, commensurate with arranging the mirroring session, exchanges by the two or more storage clusters, available internet protocol (IP) connectivity to create a full mesh of connections between all available ports of the two or more storage clusters; and
an executable portion that uses a deployment procedure, by the orchestration mechanism, to deploy the two or more storage clusters; wherein the two or more storage clusters are each new storage clusters.

12. The computer program product of claim 11, wherein deploying the two or more storage clusters further includes configuring volumes associated with the two or more storage clusters, arranging mirroring connectivity between the configured volumes, and establishing the mirroring session between the configured volumes of the two or more storage clusters.

13. The computer program product of claim 12, wherein one of the two or more storage clusters is an existing storage cluster and a second of the two or more storage clusters is a new storage cluster; and
further including an executable portion that deploys, by the orchestration mechanism, the new storage cluster by the existing storage cluster and establishes the mirroring session between the existing and new storage clusters.

14. The computer program product of claim 11, wherein each of the two or more storage clusters are existing storage clusters; and
further including an executable portion that locates, by the orchestration mechanism, each of the existing storage clusters and establishes the mirroring session between the existing storage clusters.

15. The computer program product of claim 11, wherein the orchestration mechanism is initiated through an automated management system or by a user; and
the two or more storage clusters include local and remote storage clusters.

* * * * *